(12) United States Patent
Sonokawa

(10) Patent No.: US 11,339,807 B2
(45) Date of Patent: May 24, 2022

(54) PRIORITY FLOW CONTROL VALVE

(71) Applicant: Shimadzu Corporation, Kyoto (JP)

(72) Inventor: Shogo Sonokawa, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 71 days.

(21) Appl. No.: 17/053,793

(22) PCT Filed: May 10, 2018

(86) PCT No.: PCT/JP2018/018184
§ 371 (c)(1),
(2) Date: Nov. 9, 2020

(87) PCT Pub. No.: WO2019/215883
PCT Pub. Date: Nov. 14, 2019

(65) Prior Publication Data
US 2021/0262493 A1 Aug. 26, 2021

(51) Int. Cl.
*F15B 13/02* (2006.01)
*B62D 5/08* (2006.01)
(Continued)

(52) U.S. Cl.
CPC ............ *F15B 13/022* (2013.01); *B62D 5/075* (2013.01); *B62D 5/08* (2013.01); *B66F 9/22* (2013.01);
(Continued)

(58) Field of Classification Search
CPC ...... F15B 11/16; F15B 13/022; F15B 13/027; F15B 13/0402; F15B 13/0407;
(Continued)

(56) References Cited

U.S. PATENT DOCUMENTS 3,279,558 A * 10/1966 Allen ..................... B62D 5/07
137/115.06
3,426,785 A * 2/1969 Brady ..................... B62D 5/08
137/115.1
(Continued)

FOREIGN PATENT DOCUMENTS

JP 2009014046 1/2009

OTHER PUBLICATIONS

"International Search Report (Form PCT/ISA/210) of PCT/JP2018/018184," dated Jul. 31, 2018, with English translation thereof, pp. 1-2.
(Continued)

*Primary Examiner* — William M McCalister
(74) *Attorney, Agent, or Firm* — JCIPRNET

(57) ABSTRACT

A throttle check valve includes: a poppet valve body that has an orifice formed at one end and has a hole portion formed at a side portion; a plug that has a tubular shape to surround the poppet valve body, and functions as a valve seat to come into contact with the poppet valve body; and a spring that biases the poppet valve body and the plug functioning as the valve seat in directions to come into contact with each other. When the spool is at the second position, the plug forming the distal end portion of the spool and the plug arranged in the housing come into contact with each other. The plug is provided with a protruding portion that comes into contact with the poppet valve body.

6 Claims, 10 Drawing Sheets

(51) Int. Cl.
    *B66F 9/22*     (2006.01)
    *B62D 5/07*     (2006.01)
    *F15B 13/04*     (2006.01)
    *F15B 11/16*     (2006.01)
    *F15B 13/06*     (2006.01)

(52) U.S. Cl.
    CPC ........ *F15B 13/027* (2013.01); *F15B 13/0402* (2013.01); *F15B 13/0407* (2013.01); *F15B 11/16* (2013.01); *F15B 13/06* (2013.01); *Y10T 137/2668* (2015.04)

(58) Field of Classification Search
    CPC . F15B 13/06; B62D 5/075; B62D 5/08; B66F 9/22; Y10T 137/265; Y10T 137/2668
    USPC .......................... 137/118.01, 119.01; 91/516
    See application file for complete search history.

(56) References Cited

U.S. PATENT DOCUMENTS

| | | | | |
|---|---|---|---|---|
| 3,703,186 A * | 11/1972 | Brewer | ................ | B60T 13/168 137/115.06 |
| 3,841,095 A * | 10/1974 | Baker | ................ | F15B 1/027 60/404 |
| 3,979,907 A * | 9/1976 | Paul | ................ | B66F 9/22 60/484 |
| 4,044,786 A * | 8/1977 | Yip | ................ | F15B 11/162 137/101 |
| 4,073,140 A * | 2/1978 | Lang | ................ | B62D 5/08 91/468 |
| 4,308,787 A * | 1/1982 | Parquet | ................ | B62D 11/183 91/6 |
| 4,361,166 A * | 11/1982 | Honaga | ................ | F04C 14/26 137/115.07 |
| 4,541,451 A * | 9/1985 | Wittren | ................ | F15B 13/022 137/118.06 |
| 4,552,168 A * | 11/1985 | Chatterjea | ................ | B62D 5/07 137/101 |
| 4,625,751 A * | 12/1986 | Gage | ................ | B62D 5/07 200/82 R |
| 5,201,176 A * | 4/1993 | Oshima | ................ | F15B 20/00 60/494 |
| 6,164,310 A * | 12/2000 | Yamashita | ................ | F15B 13/0407 137/119.06 |
| 2008/0271788 A1* | 11/2008 | Matsuzaki | ................ | F15B 13/022 137/115.13 |
| 2008/0276993 A1* | 11/2008 | Matsuzaki | ................ | F16K 11/07 137/118.01 |
| 2009/0242050 A1* | 10/2009 | Matsuzaki | ................ | F15B 11/0413 137/596 |

OTHER PUBLICATIONS

"Written Opinion of the International Searching Authority (Form PCT/ISA/237) of PCT/JP2018/018184," dated Jul. 31, 2018, with English translation thereof, pp. 1-5.

* cited by examiner

PRIORITY FLOW CONTROL VALVE

CROSS-REFERENCE TO RELATED APPLICATION

This application is a 371 application of an international PCT application serial no. PCT/JP2018/018184, filed on May 10, 2018. The entirety of the abovementioned patent application is hereby incorporated by reference herein and made a part of this specification.

TECHNICAL FIELD

The present invention relates to a priority flow control valve for supplying a hydraulic fluid such as hydraulic oil, supplied from a high pressure port, to a steering port with higher priority and for supplying an extra amount of the hydraulic fluid to a loading/unloading port, under a condition where a steering operation and a loading/unloading operation of a forklift or the like are implemented using the hydraulic fluid from a common hydraulic source.

BACKGROUND ART

Hydraulic pressure is used for power transmission in forklifts. Specifically, the forklifts have a configuration in which hydraulic oil supplied from a hydraulic pump driven by an engine or a motor is supplied to an actuator such as a hydraulic cylinder via a control valve. Some of such forklifts have a configuration in which the hydraulic pressure is not only used for a loading/unloading operation but is also used for a steering operation, with the loading/unloading operation and the steering operation controlled using a single hydraulic source and a control valve. The forklift with such a configuration adopts a scheme in which the hydraulic oil discharged from the hydraulic pump is supplied to a steering valve with a higher priority via a priority flow control valve on the most upstream side of the control valve, and an excess flow of the hydraulic oil flows into a loading/unloading valve.

The hydraulic oil is controlled with the priority flow control valve using a load sensing scheme. Specifically, a spool slidable in the housing is used, and when the hydraulic oil is input, the hydraulic oil at an appropriate flow is supplied to the steering valve with a higher priority, and load pressure for steering and loading/unloading is detected for moving the spool to a position achieving an opening required for flow control for the hydraulic oil.

In such a priority flow control valve, the flowrate of hydraulic oil supplied to the steering valve and the loading/unloading valve varies according to the position of a spool. Thus, there has been a problem in that a large vibration or excessive displacement of the spool may result in an unwanted speed change of the actuator or vibration of a piping and a vehicle body. To address this, a configuration has been employed in which a damper chamber is formed between the spool and a housing and a damping function is provided with a throttle check valve used, so that a stable operation of the spool is achieved (JP 2009-14046 A).

CITATION LIST

Patent Literature

Patent Literature 1: JP 2009-14046 A

SUMMARY OF INVENTION

Technical Problem

FIG. 10 is a vertical sectional view illustrating an example of a priority flow control valve incorporating a throttle check valve. FIG. 11 is an enlarged view of the vicinity of a spool 12 in the priority flow control valve. Note that FIG. 10 illustrates a state in which the spool 12 is at a second position described later, and FIG. 11 illustrates a state in which the spool 12 is at a first position described later.

This priority flow control valve includes a housing 11 in which a high pressure port P to which high pressure hydraulic oil is supplied from a hydraulic pump, a steering port PF connected to a steering valve, and a loading/unloading port EF connected to a loading/unloading valve, a load sensing port LS, and a tank port T are formed. The priority flow control valve further includes: a spool 12 configured to be slidable in the housing 11 and has a groove portion 14 formed for guiding hydraulic oil supplied from the high pressure port P to the steering port PF and the loading/unloading port EF; and a spring 13 that biases the spool 12 from a first position at which the hydraulic fluid is guided from the high pressure port P to the steering port PF and the loading/unloading port EF, to a second position at which the hydraulic oil is guided from the high pressure port P to the steering port PF. A relief valve 15 is arranged at a position, in the housing 11, to be in communication with the high pressure port P. Further, a plug 21 and a retainer plug 22 are arranged at both ends of the spool 12.

As illustrated in FIG. 11, the first position described above is a position where the groove portion 14 of the spool 12 faces both the steering port PF and the loading/unloading port EF. At this position, the high pressure hydraulic oil supplied from the high pressure port P is supplied to both the steering port PF and the loading/unloading port EF. As illustrated in FIG. 10, the second position described before is a position where the groove portion 14 of the spool 12 faces the steering port PF. At this position, the high pressure hydraulic oil supplied from the high pressure port P is supplied to the steering port PF.

A metering orifice 17 used for moving the spool 12 to an appropriate position based on pressure of the hydraulic oil is provided at an end portion of a hollow portion 16 of the spool 12. Furthermore, a throttle check valve 19 is arranged at an end portion of the spool 12 on a side closer to the plug 21. As will be described later, the throttle check valve 19 has a function of stabilizing the moving operation of the spool 12 together with a damper chamber 18 formed in the housing 11.

In the priority flow control valve having such a configuration, in a state where the hydraulic oil is not supplied, the spool 12 is at the second position to have a plug 33, forming a distal end portion of the spool 12 as described later, in contact with the plug 21, due to the spring 13. In this state, a flow path for the hydraulic oil on the side of the spool 12 closer to the steering port PF is fully open, and the flow path of the hydraulic oil on the side closer to the loading/unloading port EF is fully closed. In this state, when high pressure hydraulic oil is supplied from the pump via the high pressure port P, the hydraulic oil flows from the steering port PF of the spool 12 to a load sensing port LS via the metering orifice 17.

Then, a differential pressure of the hydraulic oil is generated before and after the metering orifice 17 according to the flowrate of the hydraulic oil. When the load applied to the spool 12 due to this differential pressure overwhelms the biasing force applied by the spring 13, the spool 12 starts moving toward the right side from the position illustrated in FIG. 10. When the flowrate of the hydraulic oil further increases, the differential pressure before and after the metering orifice 17 increases, and the load due to the pressure difference applied to the spool 12 increases. As a result, the spool 12 moves further toward the right side, and the hydraulic oil supplied from the high pressure port P also flows to the loading/unloading port EF as an excess flow. Then, the spool 12 controls the opening on the steering port PF side and the opening on the loading/unloading port EF side, and controls the flowrate of the hydraulic oil flowing thereto.

In the priority flow control valve having such a configuration, the flowrate of the hydraulic oil supplied to the steering valve and the loading/unloading valve changes depending on the opening on the steering port PF side and the opening on the loading/unloading port EF side controlled by the spool 12. Thus, a large vibration of the spool 12 or excessive displacement of the spool 12 may result in an unwanted change in the speed of the loading/unloading operation or vibrations of the piping and/or the forklift main body. To prevent this, the throttle check valve 19 is provided.

FIG. 12 is an enlarged view of the vicinity of the throttle check valve 19.

The throttle check valve 19 includes: a poppet valve body 31 which has an orifice 32 formed at one end and has a hole portion 35 formed at a side portion; a plug 33 which is made of metal, has a tubular shape to surround the poppet valve body 31, and functions as a valve seat to come into contact with the poppet valve body 31; and a spring 34 which biases the poppet valve body 31 and the plug 33 functioning as the valve seat in directions to come into contact with each other. The plug 33 is fixed to the spool 12 by being screwed to the distal end of the spool 12. When the spool 12 is at the second position described above, the plug 33 forming the distal end portion of the spool 12 and the plug 21 arranged in the housing 11 come into contact with each other.

FIG. 12 illustrates a state in which the spool 12 is at the above-mentioned second position. In this state, when the spool 12 moves from the second position to the first position, that is, in the direction in which the opening of the steering port PF is reduced and the loading/unloading port EF is opened, the poppet valve body 31 and the plug 33 that functions as the valve seat move toward the right side as illustrated in FIG. 12 while being in contact with each other.

In this state, when the spool 12 moves from the second position to the first position, that is, in the direction in which the opening of the steering port PF is reduced and the loading/unloading port EF is opened, the poppet valve body 31 comes into contact with the plug 33 that functions as the valve seat due to the spring 34. Thus, the hydraulic oil moves to the damper chamber 18 through the orifice 32 formed in the poppet valve body 31. On the other hand, when the spool 12 moves from the first position to the second position, that is, in the direction in which the opening of the steering port PF is increased and the loading/unloading port EF is closed, the pressure of the hydraulic oil causes the poppet valve body 31 to be separated from the plug 33 functioning as the valve seat. As a result, the hydraulic oil moves to the damper chamber 18 through the orifice 32 formed in the poppet valve body 31 and through both the hole portion 35 formed in the poppet valve body 31 and a gap formed between the poppet valve body 31 and the plug 33.

This configuration can achieve excellent responsiveness when the opening of the steering port PF to which the hydraulic oil is to be preferentially supplied is increased, as well as a stable operation of the spool 12 with the responsiveness suppressed in the opposite direction. As a result, an assist force for the steering operation can be prevented from being insufficient or from sharply varying due to an insufficient flow of the hydraulic oil required for the steering operation.

In the priority flow control valve having such a configuration, it has been found that the throttle check valve 19 makes an abnormal sound when high pressure hydraulic oil is supplied from the pump via the high pressure port P, the spool 12 starts moving toward the right side from the position illustrated in FIG. 10, and the hydraulic oil supplied from the high pressure port P not only flows to the steering port PF but also flows to the loading/unloading port EF.

This abnormal sound is a result of the hydraulic oil passing through the orifice 32 formed in the poppet valve body 31, as a result of the poppet valve body 31 being separated from the plug 21. A higher flow speed of the hydraulic oil passing through the orifice 32 as well as a longer time required for the hydraulic oil to pass through the orifice 32 result in this abnormal sound sensed to be larger. Such an abnormal sound irritates the operator. In particular, in a forklift of a type in which a hydraulic pump is driven by an electric motor, which has been widely used in recent years, the operation sound of the forklift itself is quiet. Thus, such abnormal sound is particularly irritating.

The present invention has been made to solve the problem described above, and an object of the present invention is to provide a priority flow control valve of a load sensing type with a throttle check valve provided to achieve a higher operation stability, with which abnormal sound can be prevented from being produced from the throttle check valve.

Solution to Problem

The invention according to claim 1 is a priority flow control valve comprising: a housing in which a high pressure port, a steering port, and a loading/unloading port are formed; a spool for guiding hydraulic fluid, supplied from the high pressure port, to the steering port and the loading/unloading port, the spool being configured to be slidable in the housing; and a spring that biases the spool from a first position at which the hydraulic fluid is guided from the high pressure port to the steering port and the loading/unloading port to a second position at which the hydraulic fluid is guided from the high pressure port to the steering port, wherein with the priority flow control valve, the hydraulic fluid, supplied from the high pressure port, is supplied to the steering port with a higher priority, and an excess amount of the hydraulic fluid is supplied to the loading/unloading port, the priority flow control valve further comprising: a damper chamber formed in the housing; a throttle check valve with which a flow path for the hydraulic fluid from the steering port to the damper chamber is throttled, the throttle check valve being provided between the steering port and the damper chamber, the throttle check valve opening a flow path for the hydraulic fluid from the damper chamber to the steering port; and an opening member which establishes an opened state of the throttle check valve when the spool is at the second position.

According to the invention of claim 2, in the invention according to claim 1, the throttle check valve includes an orifice poppet valve including: a poppet valve body in which an orifice is formed; a valve seat; and a spring which biases the poppet valve body toward the valve seat, the opening member makes the poppet valve body separated from the valve seat when the spool is at the second position, and when the spool moves from the second position to the first position, come into contact with the valve seat before the spool reaches the first position.

According to the invention of claim 3, in the invention according to claim 2, the opening member is provided to the poppet valve body, and comes into contact with a wall surface of the damper chamber when the spool is at the second position, to make the poppet valve body separated from the valve seat.

According to the invention of claim 4, in the invention according to claim 3, the opening member has a tubular shape to surround the orifice formed in the poppet valve body, and an opening portion is formed in the tubular opening member.

According to the invention of claim 5, in the invention according to claim 4, the size of the opening member in an axial direction of the spool is set to make a distal end of the spool provided at a position separated from the wall surface of the damper chamber, when the spool is at the second position.

According to the invention of claim 6, in the invention according to claim 2, the opening member is provided to the wall surface of the damper chamber, and comes into contact with the poppet valve body when the spool is at the second position, to make the poppet valve body separated from the valve seat.

Advantageous Effects of Invention

With the invention according to claim 1, the opened state of the throttle check valve is established due to the opening member, when the spool is at the second position. Thus, the noise produced when the hydraulic fluid passes through the orifice can be suppressed. Thus, in a priority flow control valve of a load sensing type with a throttle check valve provided to achieve a higher operation stability, abnormal sound is prevented from being produced from the throttle check valve.

With the inventions according claims 2 to 6, the poppet valve body is separated from the valve seat when the spool is at the second position. The poppet valve body comes into contact with the valve seat before the spool reaches the first position. Thus, the abnormal sound can be prevented from being produced from the throttle check valve while maintaining the function of the throttle check valve.

With the invention according to claim 4, the flow path for the hydraulic fluid is constantly maintained in the throttle check valve due to the opening portion, whereby the state where the flow of the hydraulic fluid passing through the throttle check valve drops to zero can be avoided.

With the invention according to claim 5, when the spool is at the second position, the distal end of the spool is at a position away from the wall surface in the damper chamber. Thus, the distal end of the spool and the wall surface of the damper chamber is prevented from coming into close contact and sticking with each other.

DESCRIPTION OF EMBODIMENTS

Figure 1:
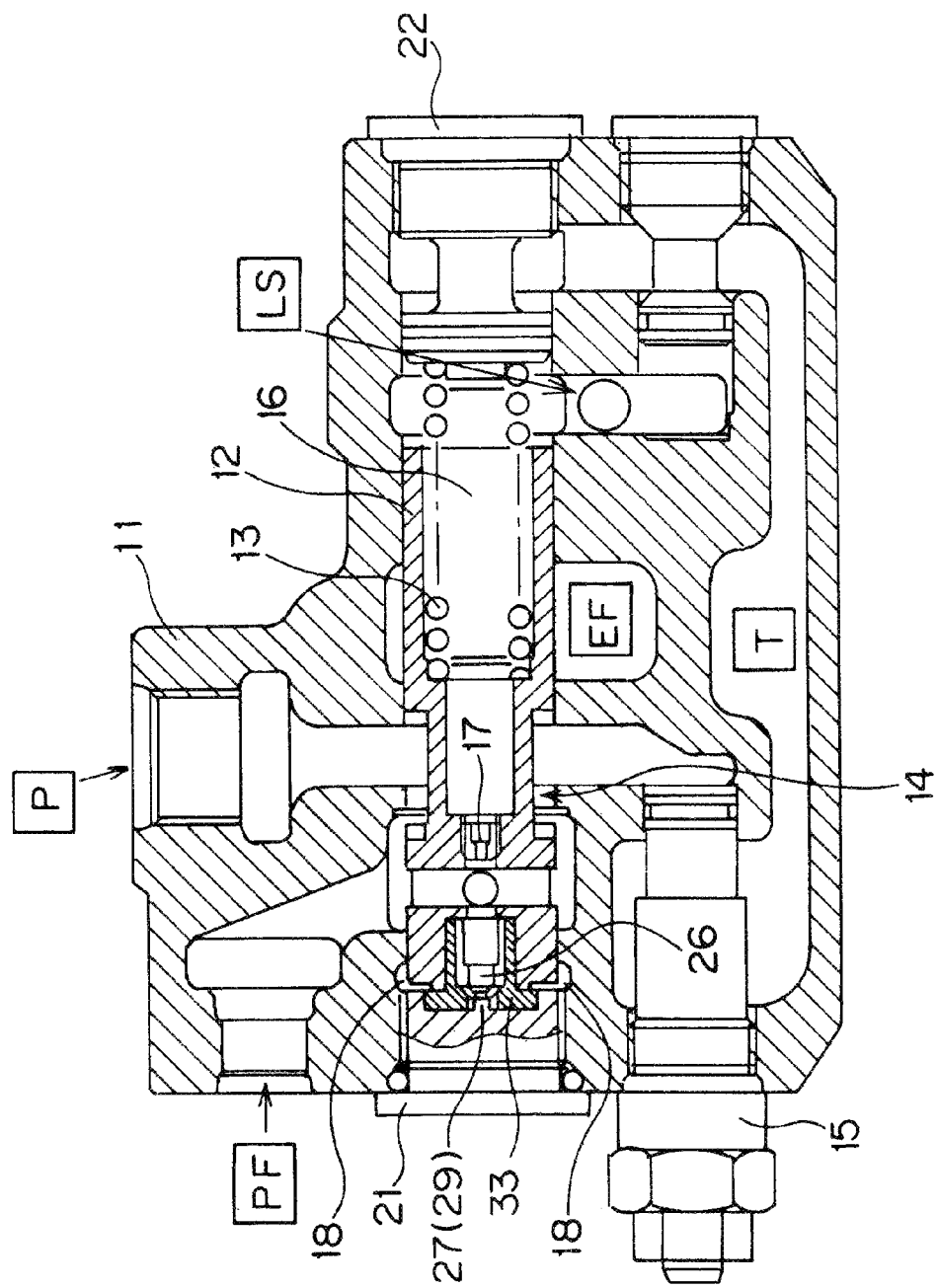
FIG. 1 is a vertical sectional view illustrating a priority flow control valve incorporating a throttle check valve 26 according to the present invention.
Figure 2:
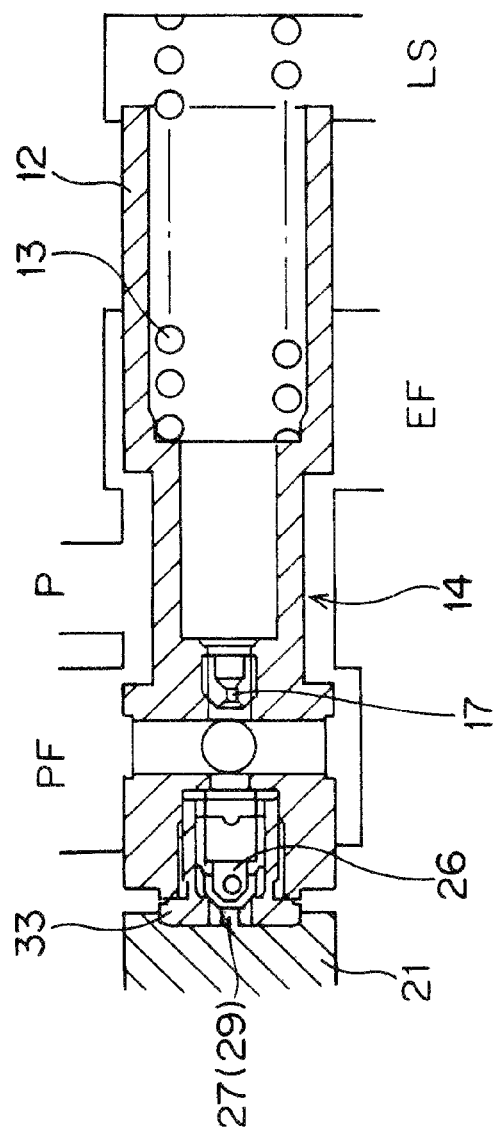
FIG. 2 is an enlarged view of the vicinity of a spool 12 in the priority flow control valve.
Figure 3:
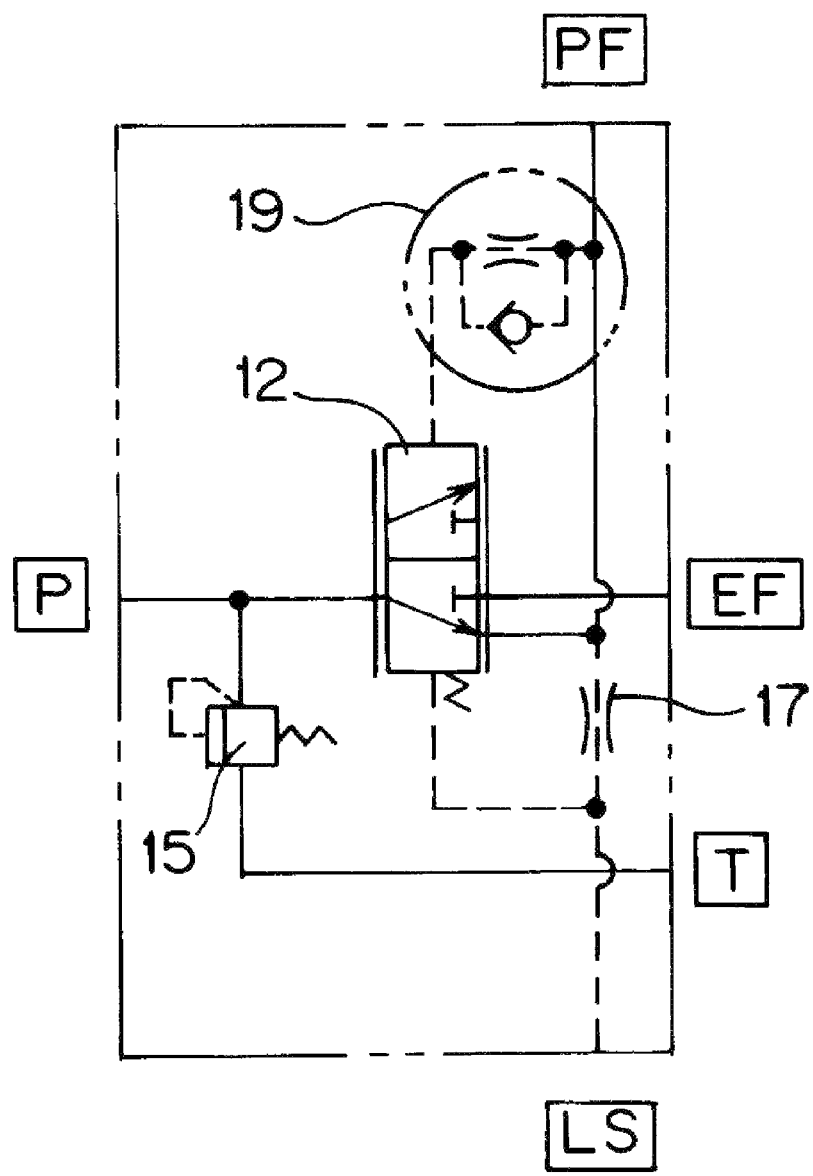
FIG. 3 is a hydraulic circuit diagram of the priority flow control valve.
Figure 10:
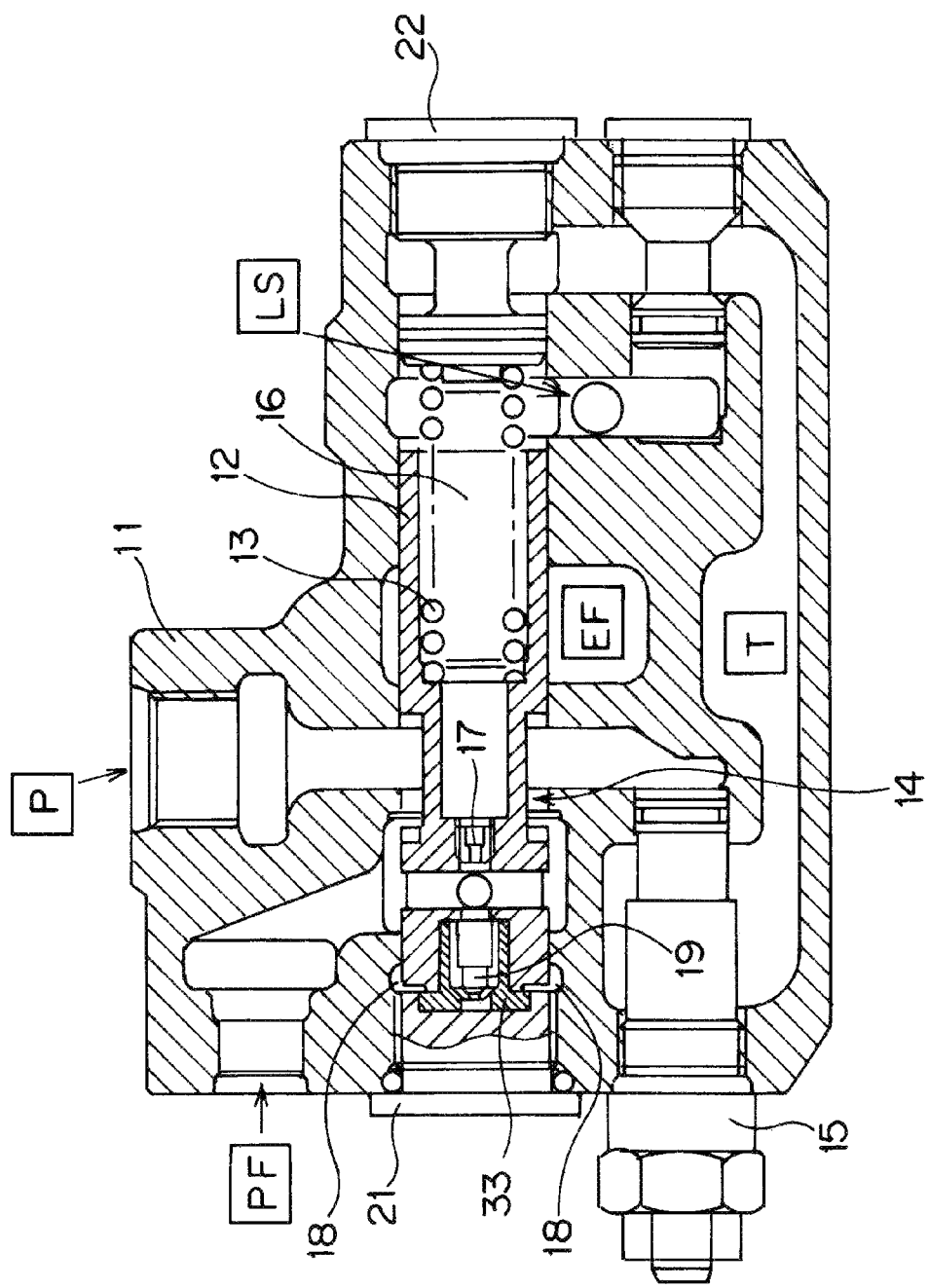
FIG. 10 is a vertical sectional view illustrating an example of a priority flow control valve incorporating a throttle check valve.
Figure 11:
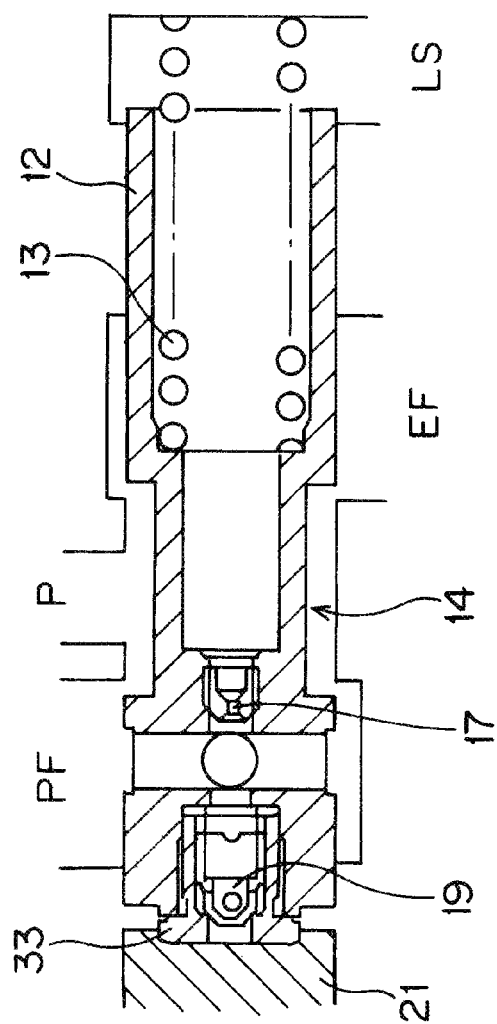
FIG. 11 is an enlarged view of the vicinity of a spool 12 in the priority flow control valve.

An embodiment of the present invention will be described below with reference to the drawings. FIG. 1 is a vertical sectional view illustrating a priority flow control valve incorporating a throttle check valve 26 according to the present invention. FIG. 2 is an enlarged view of the vicinity of a spool 12 in the priority flow control valve. FIG. 3 is a hydraulic circuit diagram of this priority flow control valve. FIG. 1 illustrates a state in which the spool 12 is at a second position described later, and FIG. 2 illustrates a state in which the spool 12 is at a first position described later. The members that are the same as those in FIGS. 10 and 12 described above are denoted with the same reference numerals.

This priority flow control valve is mounted on the forklift and is for implementing a steering operation and a loading/unloading operation of the forklift. This priority flow control valve includes a housing 11 in which a high pressure port P to which high pressure hydraulic oil is supplied from a hydraulic pump, a steering port PF connected to a steering valve, and a loading/unloading port EF connected to a loading/unloading valve for implementing raising/lowering or the like of the fork, a load sensing port LS, and a tank port T are formed.

The priority flow control valve further includes: a spool 12 configured to be slidable in the housing 11 and has a groove portion 14 formed for guiding hydraulic oil supplied from the high pressure port P to the steering port PF and the loading/unloading port EF; and a spring 13 that biases the spool 12 from a first position at which the hydraulic fluid is guided from the high pressure port P to the steering port PF and the loading/unloading port EF, to a second position at which the hydraulic oil is guided from the high pressure port P to the steering port PF. A relief valve 15 is arranged at a position, in the housing 11, to be in communication with the high pressure port P. Further, a plug 21 and a retainer plug 22 are arranged at both ends of the spool 12.

As illustrated in FIG. 2, the first position described above is a position where the groove portion 14 of the spool 12 faces both the steering port PF and the loading/unloading port EF. At this position, the high pressure hydraulic oil supplied from the high pressure port P is supplied to both the steering port PF and the loading/unloading port EF. As illustrated in FIG. 1, the second position described above is a position where the groove portion 14 of the spool 12 faces the steering port PF. At this position, the high pressure hydraulic oil supplied from the high pressure port P is supplied to the steering port PF.

A metering orifice 17 used for moving the spool 12 to an appropriate position based on pressure of the hydraulic oil is provided at an end portion of a hollow portion 16 of the spool 12. Furthermore, a throttle check valve 26 is arranged at an end portion of the spool 12 on a side closer to the plug 21. As will be described later, the throttle check valve 26 has a function of stabilizing the moving operation of the spool 12 together with a damper chamber 18 formed in the housing 11.

In the priority flow control valve having such a configuration, in a state where the hydraulic oil is not supplied, the spool 12 is at the second position to have a plug 33, forming a distal end portion of the spool 12 as described later, in contact with the plug 21, due to the spring 13. In this state, a flow path for the hydraulic oil on the side of the spool 12 closer to the steering port PF is fully open, and the flow path of the hydraulic oil on the side closer to the loading/unloading port EF is fully closed. In this state, when high pressure hydraulic oil is supplied from the pump via the high pressure port P, the hydraulic oil flows from the steering port PF of the spool 12 to a load sensing port LS via the metering orifice 17.

Then, a differential pressure of the hydraulic oil is generated before and after the metering orifice 17 according to the flowrate of the hydraulic oil. When the load applied to the spool 12 due to this differential pressure overwhelms the biasing force applied by the spring 13, the spool 12 starts moving toward the right side from the position illustrated in FIG. 1. When the flowrate of the hydraulic oil further increases, the differential pressure before and after the metering orifice 17 increases, and the load due to the pressure difference applied to the spool 12 increases. As a result, the spool 12 moves further toward the right side, and the hydraulic oil supplied from the high pressure port P also flows to the loading/unloading port EF as an excess flow. Then, the spool 12 controls the opening on the steering port PF side and the opening on the loading/unloading port EF side, and controls the flowrate of the hydraulic oil flowing thereto.

In the priority flow control valve having such a configuration, the flowrate of the hydraulic oil supplied to the steering valve and the loading/unloading valve changes based on the opening on the steering port PF side and the opening on the loading/unloading port EF side controlled by the spool 12. Thus, a large vibration of the spool 12 or excessive displacement of the spool 12 may result in an unwanted change in the speed of the loading/unloading operation or vibrations of the piping and/or the forklift main body. To prevent this, the throttle check valve 26 is provided.

Figure 4:
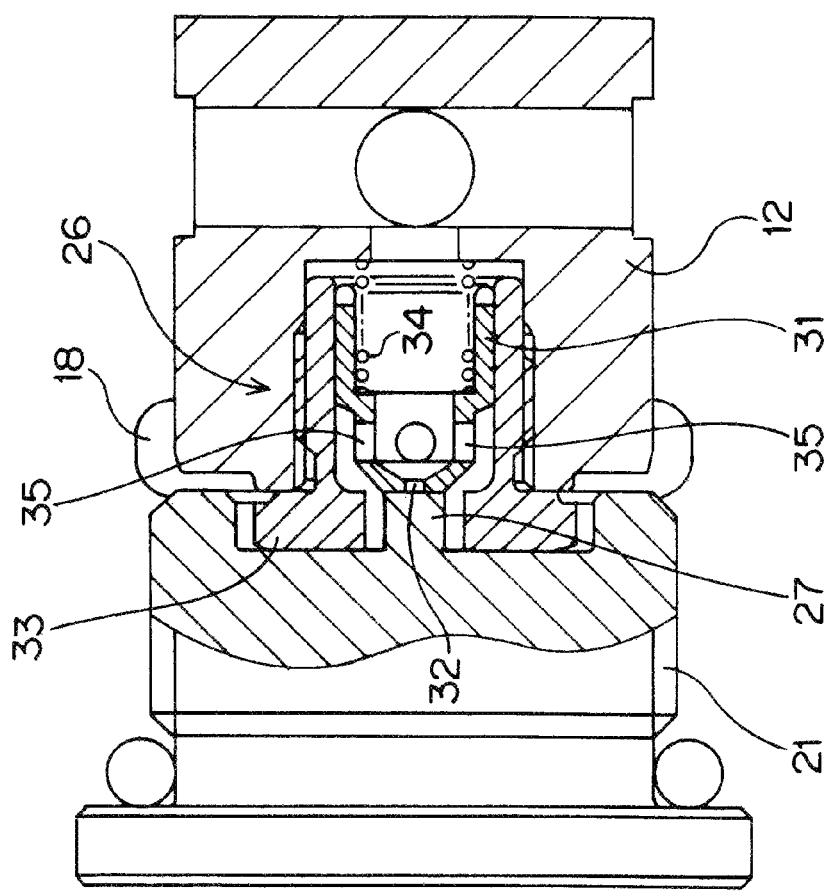
FIG. 4 is an enlarged view of the vicinity of the throttle check valve 26 in a throttle check mechanism according to a first embodiment of the present invention.

FIG. 4 is an enlarged view of the vicinity of the throttle check valve 26 in a throttle check mechanism according to a first embodiment of the present invention. FIG. 4 illustrates a state in which the spool 12 is at the above-mentioned second position.

The throttle check valve 26 includes a poppet valve body 31 having an orifice 32 formed at one end and has a hole portion 35 formed at a side portion; a plug 33 that is made of metal, has a tubular shape to surround the poppet valve body 31, and functions as a valve seat to come into contact with the poppet valve body 31; and a spring 34 that biases the poppet valve body 31 and the plug 33 functioning as the valve seat in directions to come into contact with each other. The plug 33 is fixed to the spool 12 by being screwed to the distal end of the spool 12. When the spool 12 is at the second position described above, the plug 33 forming the distal end portion of the spool 12 and the plug 21 arranged in the housing 11 come into contact with each other.

As illustrated in FIG. 4, the plug 21 is provided with a protruding portion 27 that comes into contact with the poppet valve body 31. With the protruding portion 27 thus provided, the poppet valve body 31 is separated from the plug 33 that functions as a valve seat, when the spool 12 is at the second position. The protruding portion 27 functions as an opening member that opens the throttle check valve 26 when the spool 12 is at the second position.

In the state illustrated in FIG. 4, when the spool 12 starts moving from the second position to the first position, that is, in the direction in which the opening of the steering port PF is reduced and the loading/unloading port EF is opened, the distance between the poppet valve body 31 and the plug 33 that functions as the valve seat gradually decreases due to the spring 34, as the spool 12 moves. Before the spool 12 reaches the first position, the poppet valve body 31 comes into contact with the plug 33 that functions as a valve seat.

When the spool 12 starts moving in the direction from the second position to the first position, the poppet valve body 31 is separated from the plug 33 that functions as a valve seat due to the protruding portion 27. Thus, the hole portion 35 formed in the poppet valve body 31 and the gap formed between the poppet valve body 31 and the plug 33 are provided as a flow path for the hydraulic oil to flow to the damper chamber 18. Therefore, the abnormal sound can be prevented from being produced when the hydraulic oil flows through the orifice 32 formed in the poppet valve body 31, as in the case of the throttle check valve 19 illustrated in FIG. 12.

In this state, when the spool 12 moves from the second position to the first position, that is, in the direction in which the opening of the steering port PF is reduced and the loading/unloading port EF is opened, the poppet valve body 31 is already in contact with the plug 33. Thus, the hydraulic oil moves to the damper chamber 18 through the orifice 32 formed in the poppet valve body 31. On the other hand, when the spool 12 moves from the first position to the second position, that is, in the direction in which the opening of the steering port PF is increased and the loading/unloading port EF is closed, the pressure of the hydraulic oil causes the poppet valve body 31 to be separated from the plug 33 functioning as the valve seat. As a result, the hydraulic oil moves to the damper chamber 18 through the orifice 32 formed in the poppet valve body 31 and through both the hole portion 35 formed in the poppet valve body 31 and a gap formed between the poppet valve body 31 and the plug 33.

This configuration can achieve excellent responsiveness when the opening of the steering port PF to which the hydraulic oil is to be preferentially supplied is increased, as well as a stable operation of the spool 12 with the responsiveness suppressed in the opposite direction. As a result, an assist force for the steering operation can be prevented from being insufficient or from sharply varying due to an insufficient flowrate of the hydraulic oil required for the steering operation.

Figure 5:
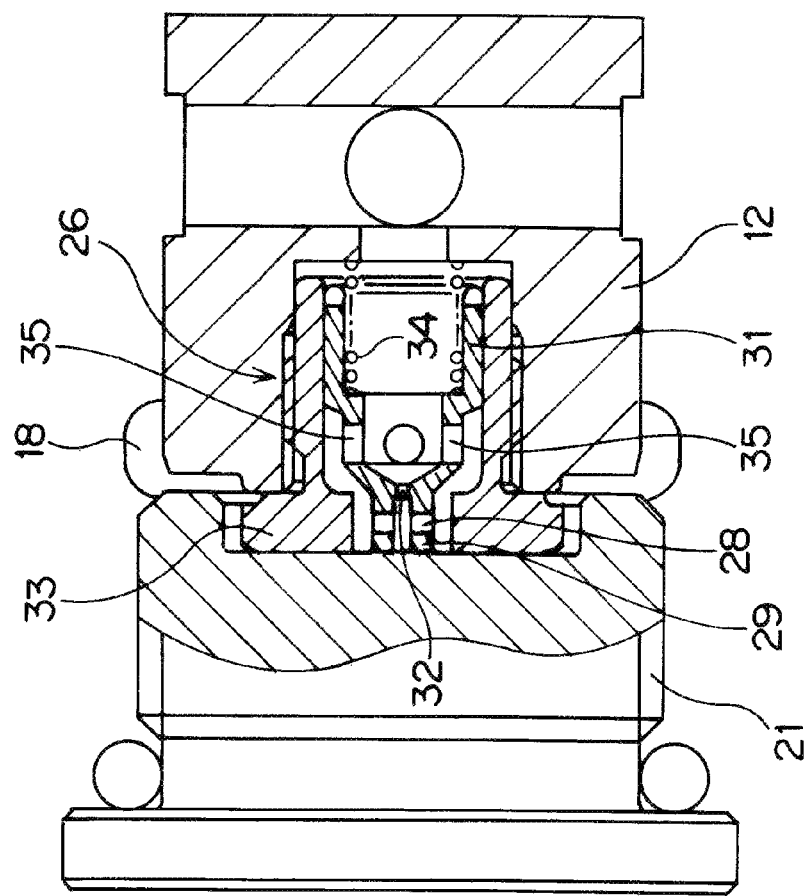
FIG. 5 is an enlarged view of the vicinity of the throttle check valve 26 in a throttle check mechanism according to a second embodiment of the present invention.

Next, another embodiment of the throttle check mechanism will be described. FIG. 5 is an enlarged view of the vicinity of the throttle check valve 26 in a throttle check mechanism according to a second embodiment of the present invention. FIG. 5 illustrates a state in which the spool 12 is at the above-mentioned second position. Members that are the same as those of the throttle check valve 26 illustrated in FIG. 4 are denoted by the same reference numerals, and detailed description thereof will be omitted.

In the throttle check mechanism according to the first embodiment described above, the poppet valve body 31 is separated from the plug 33 that functions as a valve seat when the spool 12 is at the second position due to the protruding portion 27 formed on the plug 21. On the other hand, in the throttle check mechanism according to the second embodiment, a tubular body 29 having a shape surrounding the orifice 32 provided to the poppet valve body 31 and having an opening portion 28 formed makes the poppet valve body 31 separated from the plug 33 that functions as a valve seat, when the spool 12 is at the second position. When the spool 12 is at the second position, the tubular body 29 comes into contact with the plug 21 forming a wall surface of the damper chamber 18, to function as an opening member causing the poppet valve body 31 to be separated from the plug 33 that functions as a valve seat.

When the spool 12 starts moving in the direction from the second position to the first position, the poppet valve body 31 is separated from the plug 33 that functions as a valve seat due to the tubular body 29. Thus, the hole portion 35 formed in the poppet valve body 31, the opening portion 28, and the gap formed between the poppet valve body 31 and the plug 33 are provided as a flow path for the hydraulic oil to flow to the damper chamber 18. Therefore, the abnormal sound can be prevented from being produced when the hydraulic oil flows through the orifice 32 formed in the poppet valve body 31, as in the case of the throttle check valve 19 illustrated in FIG. 12.

As in the embodiment illustrated in FIG. 4, in this state, when the spool 12 moves from the second position to the first position, that is, in the direction in which the opening of the steering port PF is reduced and the loading/unloading port EF is opened, the poppet valve body 31 is already in contact with the plug 33. Thus, the hydraulic oil moves to the damper chamber 18 through the orifice 32 formed in the poppet valve body 31. On the other hand, when the spool 12 moves from the first position to the second position, that is, in the direction in which the opening of the steering port PF is increased and the loading/unloading port EF is closed, the pressure of the hydraulic oil causes the poppet valve body 31 to be separated from the plug 33 functioning as the valve seat. As a result, the hydraulic oil moves to the damper chamber 18 through the orifice 32 formed in the poppet valve body 31 and through both the hole portion 35 formed in the poppet valve body 31 and a gap formed between the poppet valve body 31 and the plug 33.

This configuration can achieve excellent responsiveness when the opening of the steering port PF to which the hydraulic oil is to be preferentially supplied is increased, as well as a stable operation of the spool 12 with the responsiveness suppressed in the opposite direction. As a result, an assist force for the steering operation can be prevented from being insufficient or from sharply varying due to an insufficient flowrate of the hydraulic oil required for the steering operation.

Figure 6:
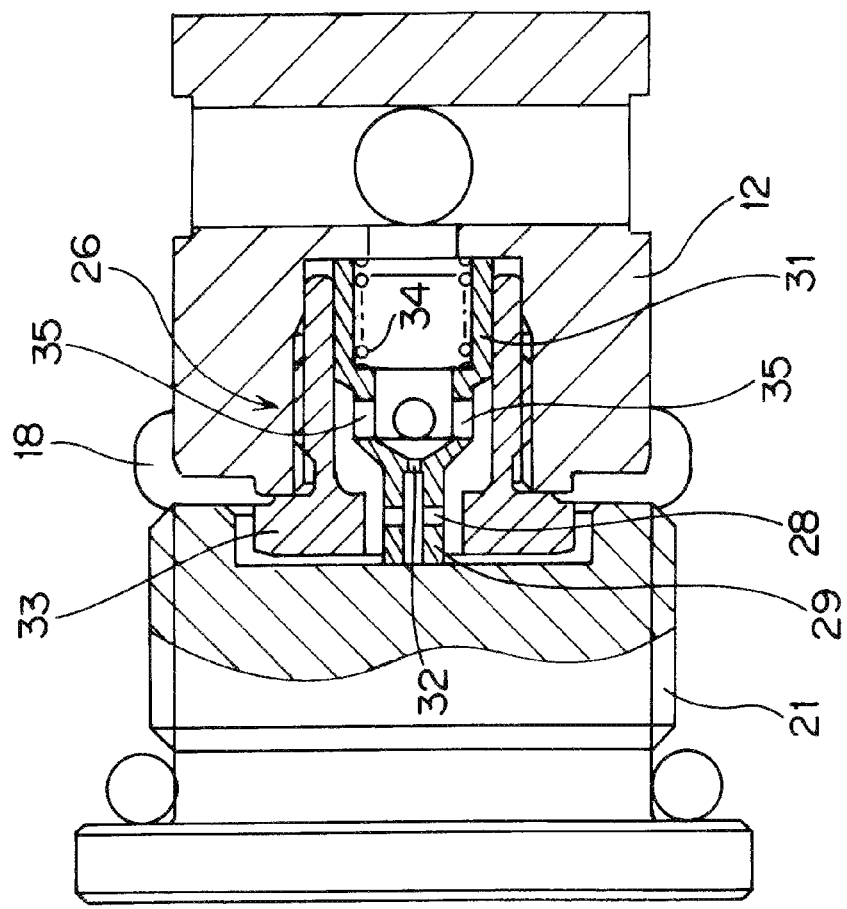
FIG. 6 is an enlarged view of the vicinity of the throttle check valve 26 in a throttle check mechanism according to a third embodiment of the present invention.

Next, still another embodiment of the throttle check mechanism will be described. FIG. 6 is an enlarged view of the vicinity of the throttle check valve 26 in a throttle check mechanism according to a third embodiment of the present invention. FIG. 6 illustrates a state in which the spool 12 is at the above-mentioned second position. This embodiment is different from the throttle check valve 26 illustrated in FIG. 5, in the size of the tubular body 29 that functions as the opening member. Thus, in the following description, only this point will be described.

In the throttle check mechanism according to the third embodiment, a tubular body 29 having a shape surrounding the orifice 32 provided to the poppet valve body 31 and having an opening portion 28 formed makes the poppet valve body 31 separated from the plug 33 that functions as a valve seat, when the spool 12 is at the second position. In the third embodiment, as illustrated in FIG. 6, the size of the tubular body 29 functioning as the opening member in an axial direction of the spool 12 is set to make the plug 33 forming the distal end of the spool 12 separated from the plug 21 forming the wall surface of the damper chamber 18, when the spool 12 is at the second position.

In the throttle check mechanism according to the second embodiment illustrated in FIG. 5, when the spool 12 is at the second position, the plug 33 forming the distal end of the spool 12 and the plug 21 forming the wall surface in the damper chamber 18 are in contact with each other. With this configuration, a lack of oil may result in sticking between contact surfaces of the plug 33 and the plug 21 in close contact with each other. In order to prevent this, it is necessary to take measures such as grooving the contact surface between the plug 33 and the plug 21.

On the other hand, in the throttle check mechanism according to the third embodiment, when the spool 12 is at the second position, the plug 33 forming the distal end of the spool 12 and the plug 21 forming the wall surface in the damper chamber 18 are separated from each other due to the tubular body 29. Thus, this can prevent the plug 33 and the plug 21 from sticking to each other without grooving or the like.

Figure 7:
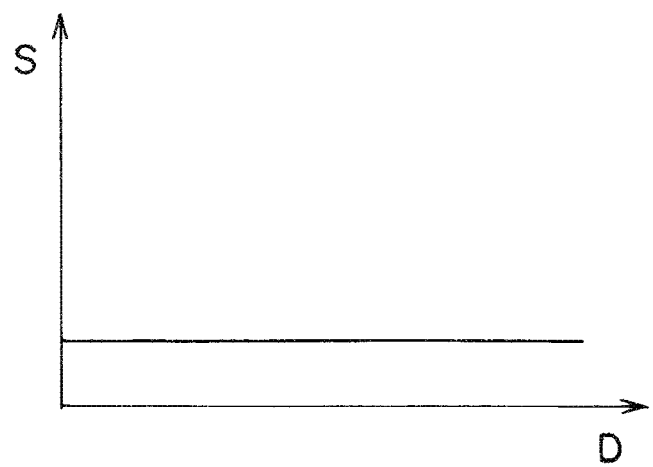
FIG. 7 is a graph illustrating a relationship between a displacement of the spool 12 and a passage area for hydraulic oil in the throttle check mechanism corresponding to the displacement.
Figure 8:
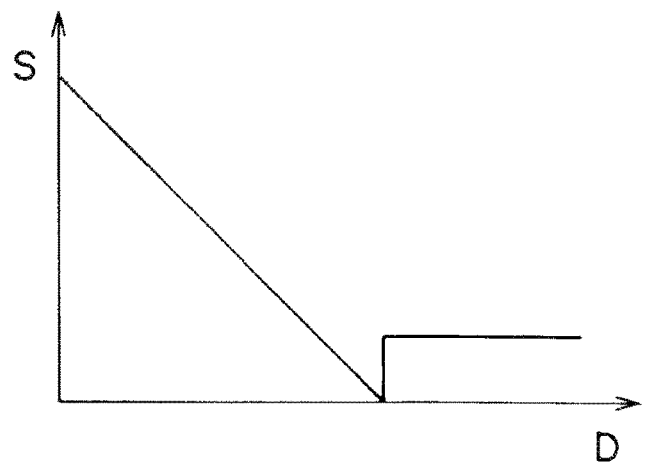
FIG. 8 is a graph illustrating the relationship between a displacement of the spool 12 and a passage area for hydraulic oil in the throttle check mechanism corresponding to the displacement.
Figure 9:
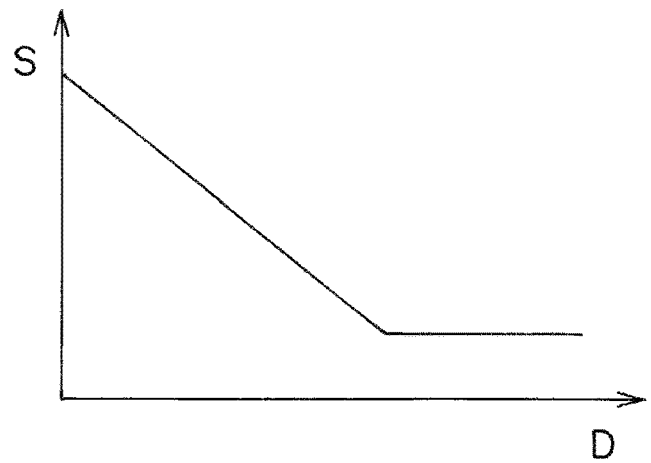
FIG. 9 is a graph illustrating the relationship between a displacement of the spool 12 and a passage area for hydraulic oil in the throttle check mechanism corresponding to the displacement.

FIGS. 7 to 9 are graphs illustrating the relationship between a displacement D of the spool 12 and a passage area S of the hydraulic oil in the throttle check mechanism corresponding to the displacement. In the graphs, the horizontal axis represents the displacement D of the spool 12, and the vertical axis represents the passage area S of the hydraulic oil in the throttle check mechanism. Furthermore, FIGS. 7 to 9 respectively illustrate the case of the throttle check mechanism illustrated in FIG. 12, the case of the throttle check mechanism illustrated in FIG. 4, and the case of the throttle check mechanism illustrated in FIGS. 5 and 6.

Figure 12:
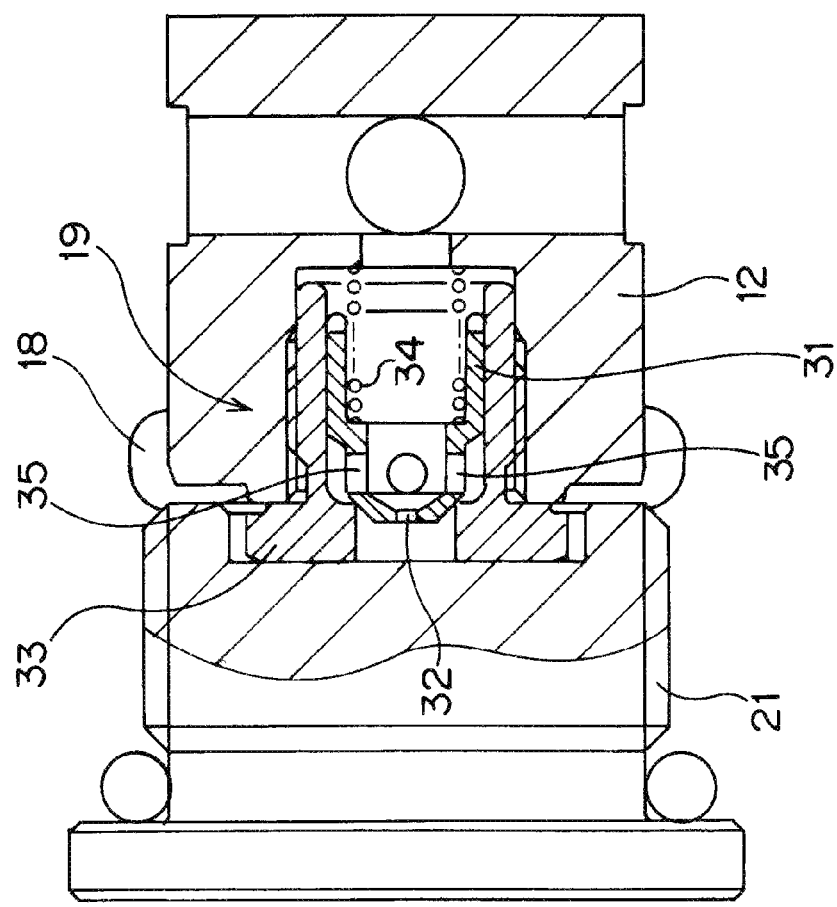
FIG. 12 is an enlarged view of the vicinity of the throttle check valve 19.

In the throttle check mechanism illustrated in FIG. 12, the passage area S of the hydraulic oil is a constant area defined by the orifice 32 formed in the poppet valve body 31 as illustrated in FIG. 7. On the other hand, in the case of the throttle check mechanism illustrated in FIG. 4, as illustrated in FIG. 8, the passage area S of the hydraulic oil gradually decreases with the gap formed between the poppet valve body 31 and the plug 33 gradually decreasing in size as the displacement D of the spool 12 increases, until the passage area S temporarily drops to zero. Then, when the poppet valve body 31 and the protruding portion 27 are separated from each other, the passage area S becomes a constant area defined by the orifice 32 formed in the poppet valve body 31.

On the other hand, in the case of the throttle check mechanism illustrated in FIGS. 5 and 6, as illustrated in FIG. 9, the passage area S of the hydraulic oil gradually decreases with the gap formed between the poppet valve body 31 and the plug 33 gradually decreasing in size as the displacement D of the spool 12 increases. Then, when the poppet valve body 31 and the protruding portion 27 are separated from each other, the passage area S becomes a constant area defined by the orifice 32 formed in the poppet valve body 31 and the opening portion 28. Therefore, in the case of the embodiment illustrated in FIGS. 5 and 6, the flow path for the hydraulic oil is constantly provided in the throttle check valve 26 due to the opening portion 28 formed in the tubular body 29. Thus, a state where the flow of the hydraulic oil passing through the throttle check valve 26 is zero can be avoided. All things considered, phenomenons such as temporal rise in the hydraulic oil pressure can be prevented.

The invention claimed is:

1. A priority flow control valve comprising:
a housing in which a high pressure port, a steering port, and a loading/unloading port are formed;
a spool for guiding hydraulic fluid, supplied from the high pressure port, to the steering port and the loading/unloading port, the spool being configured to be slidable in the housing; and
a spring that biases the spool from a first position at which the hydraulic fluid is guided from the high pressure port to the steering port and the loading/unloading port to a second position at which the hydraulic fluid is guided from the high pressure port to the steering port, wherein
with the priority flow control valve, the hydraulic fluid, supplied from the high pressure port, is supplied to the steering port with a higher priority, and an excess amount of the hydraulic fluid is supplied to the loading/unloading port, the priority flow control valve further comprising:
a damper chamber formed in the housing;
a throttle check valve with which a flow path for the hydraulic fluid from the steering port to the damper chamber is throttled, the throttle check valve being provided between the steering port and the damper chamber, the throttle check valve opening a flow path for the hydraulic fluid from the damper chamber to the steering port; and
an opening member that establishes an opened state of the throttle check valve when the spool is at the second position.

2. The priority flow control valve according to claim 1, wherein
the throttle check valve includes an orifice poppet valve including: a poppet valve body in which an orifice is formed; a valve seat; and a spring that biases the poppet valve body toward the valve seat,
the opening member makes the poppet valve body separated from the valve seat when the spool is at the second position, and
when the spool moves from the second position to the first position, the opening member makes the poppet valve body come into contact with the valve seat before the spool reaches the first position.

3. The priority flow control valve according to claim 2, wherein
the opening member is provided to the poppet valve body, and comes into contact with a wall surface of the damper chamber when the spool is at the second position, to make the poppet valve body separated from the valve seat.

4. The priority flow control valve according to claim 3, wherein
the opening member has a tubular shape to surround the orifice formed in the poppet valve body, and an opening portion is formed in the tubular opening member.

5. The priority flow control valve according to claim 4, wherein
a size of the opening member in an axial direction of the spool is set to make a distal end of the spool provided at a position separated from the wall surface of the damper chamber, when the spool is at the second position.

6. The priority flow control valve according to claim 2, wherein
the opening member is provided to a wall surface of the damper chamber, and comes into contact with the poppet valve body when the spool is at the second position, to make the poppet valve body separated from the valve seat.

* * * * *